United States Patent [19]
Glasser

[11] 3,883,745
[45] May 13, 1975

[54] COMBINED HOLDER AND ADAPTER FOR LIQUID SCINTILLATION COUNTERS

[75] Inventor: Herman Glasser, New Hyde Park, N.Y.

[73] Assignee: Nuclear Associates, Inc., Westbury, N.Y.

[22] Filed: June 18, 1973

[21] Appl. No.: 371,271

Related U.S. Application Data

[63] Continuation of Ser. No. 15,577, Feb. 27, 1970, abandoned.

[52] U.S. Cl. .............. 250/363; 250/361; 250/506
[51] Int. Cl. ............................................. G01t 1/20
[58] Field of Search .......... 250/304, 361, 363, 393, 250/483, 493, 496, 522, 432, 362, 506, 526

[56] References Cited
UNITED STATES PATENTS

| | | | |
|---|---|---|---|
| 2,855,520 | 10/1958 | Stoddart et al. | 250/361 |
| 2,857,524 | 10/1958 | Tabern et al. | 250/522 |
| 3,404,270 | 10/1968 | Ross | 250/364 |
| 3,553,454 | 1/1971 | Olson | 250/363 |
| 3,724,956 | 4/1973 | Neary | 250/361 |

OTHER PUBLICATIONS

Nucleonics, October 1956, page 78, "Large Plastic Well——, " by Hine et al.

Primary Examiner—Harold A. Dixon
Attorney, Agent, or Firm—Lilling & Siegel

[57] ABSTRACT

An adaptive container for liquid scintillation counters. The adaptive container permits a smaller volume of radioactive material to be accurately measured by a liquid scintillation counter.

4 Claims, 8 Drawing Figures

INVENTOR.
HERMAN GLASSER
BY Lilling and Siegel
ATTORNEYS

INVENTOR.
HERMAN GLASSER

BY Lilling and Siegel
ATTORNEYS

3,883,745

COMBINED HOLDER AND ADAPTER FOR LIQUID SCINTILLATION COUNTERS

This is a continuation of application Ser. No. 15,577, filed Feb. 27, 1970 and now abandoned.

BACKGROUND OF THE INVENTION:

This invention relates to an adaptive container for a standard size container and, more particularly, to an adaptive container for use with a liquid scintillation counter.

In the nuclear field, a fairly common method of assaying radioactivity in liquid form is by utilizing an instrument called a liquid scintillation counter. As used, the counter measures the amount of radioactivity in material which is placed in a standard-sized container to be held by the holder portion of the counter. In order to measure the radioactivity of the material accurately, the container must be adequately filled to the top. Unfortunately, this requirement restricts the volume of radioactive material which can be measured because of the standard sized holder. In order to measure a lesser volume of material, the container used in the prior art is not completely filled. This leads to great inaccuracy in the count of the radioactive material and is unacceptable when an accurate measurement is required.

In other more general areas, other than the nuclear field, machines are commonly devised to work with an adequately filled standard size container. Where less material is required in the machine's process, the container has to be partially filled which often creates problems relating to the void left in the partially filled container. Since these machines cannot work with other than a standard size container, the machines have limited use.

An object of the present invention is to enable machines which required standard size container to find wider use.

Another object of the present invention is to permit scintillation counters to measure a volume smaller than those accurately measurable previously.

Still another object of the present invention is to provide an adaptive container which is simple in construction, and still accomplishes the above mentioned objects.

Another object of the present invention is to provide an adaptive container which is attractive in appearance.

Still another object of the present invention is to provide an adaptive container which is relatively inexpensive.

Another object of the present invention is to provide an adaptive container which is relatively durable.

Other objects, advantages, and features of the present invention will become more apparent from the following description.

SUMMARY

In accordance with the principles of the present invention, the above objects are accomplished by providing an adaptive container having a set of standard outer dimensions while being capable of holding a second container smaller in size which will be adequately filled by the material held therein.

In the prior art, the measurement of volumes of material smaller than that which would substantially fill the standard container was inaccurate as described above. In accordance with the principles of the present invention, a smaller second container will be adequately filled before insertion in the adaptive standard-sized container of the present invention. In this manner, the type of inaccuracy encountered in the prior art, when attempting to measure or work with smaller volumes of material is eliminated.

In the nuclear field, liquid scintillation counters have a standardized holder which holds a standard size container. Generally, the container is cylindrical in shape and, in accordance with the principles of the present invention, a smaller volume of radioactive material may be accurately measured. To this end, a cylindrical adaptor tube whose outer dimensions are equal to the outer dimensions of the standard size container is utilized; a second smaller tube or container holding the amount of material to be measured is inserted in the adaptor tube. By adequately filling the inner container and placing it in the adaptive container, the inaccuracies encountered in the prior art, when attempting to measure a smaller volume of radioactive material, are eliminated.

Preferably, the outer dimensions of the inner container are predetermined to enable a snug fit to be made between the inner and adaptive containers. In order to permit easy removal of the snugly-held inner container, a hole can be provided in the bottom of the adaptive container. It should be understood, at this point, that a snug fit is not required between the inner and adaptive containers since the material to be measured adequately fills the inner container and any slight jarring between the inner and adaptive containers will not be significantly affect the radioactivity measurements.

As another feature of the present invention, the adaptive container can be of a plastic or glass type material, preferably transparent or at least translucent to permit an operator to monitor the fit between the inner container and the adaptive container. In this way, the quality of the fit of the inner container in the adaptive container, and the amount of material in the inner container, may be observed before a cap or top may be placed on the adaptive container and placed in the holder of the liquid scintillation counter.

It may readily be seen, that by applying the principles of the present invention, a simple yet effective device enables the liquid scintillation counter to be more widely used than previously possible. In particular, by utilizing the principles of the present invention, a smaller volume of radioactive material may be measured accurately. Other typpes of devices and machines utilizing standard size container which must be adequate will benefit by employing the principles of the present invention. It is to be understood that the presentation of a liquid scintillation counter to be used with the principles of the present invention is not to be construed as limiting in any sense.

DESCRIPTION OF THE PREFERRED EMBODIMENT:

One advantageous use of the present invention may be found with liquid scintillation counters. In the prior art, a standard size container is used in a holder which is part of the liquid scintillation counter and measurements of the material held therein are made. When it is desired to measure a small volume of radioactive material, the prior art liquid scintillation counters fail to provide an accurate measurement because the standard container is only partially filled. By providing the adaptive container of the present invention, a smaller volume of material may be measured accurately because the second container, which is inserted in the adaptive container, is adequately filled, thereby eliminating the inaccurate measurements previously obtained.

Figure 1:
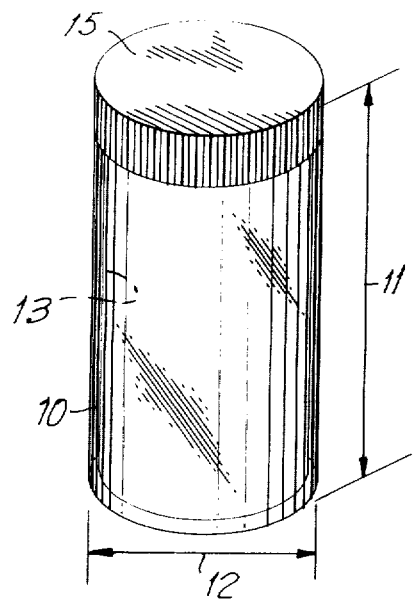
FIG. 1 is a perspective view of the outside and cover of one embodiment of the adaptive container of the present invention.
Figure 3:
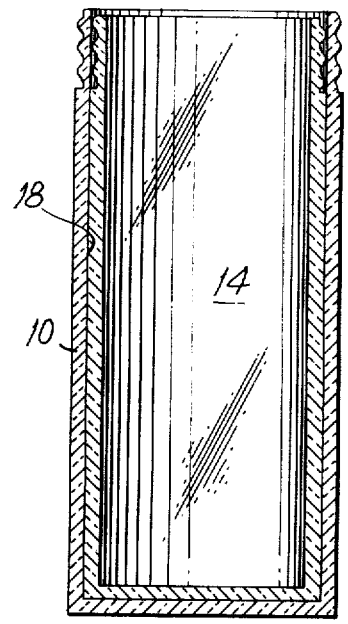
FIG. 3 is a cross-sectional view of the adaptive and second containers taken generally along the lines 3—3 of FIG. 2.
Figure 2:
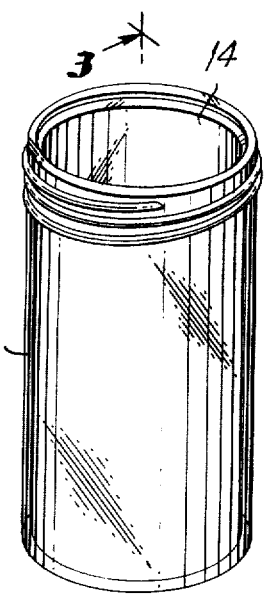
FIG. 2 is another perspective view of the adaptive container of the present invention shown in FIG. 1 with the top removed showing a second inner container in the adaptive container.

FIGS. 1–3 diagrammatically illustrate one embodiment of the principles of the present invention. An adaptive container 10 has outer dimensions 11 and 12, and, for instance, for use with a liquid scintillation counter has a diameter 12 of approximately 28 millimeters and a maximum heights 11 of approximately 60 millimeters. Those outer dimensions are approximately equal to those of the standard size container used with the counter.

The adaptive container 10 has an inner recess 13 in order to receive a second container 14. In this modification, the container 14, which is first adequately filled, is placed in the adaptive container 10 which, thereafter, is suitably covered by a cap or cover 15. The cap is grooved in order to permit its easy manipulation.

Preferably, a snug fit will be achieved between inner container 14 and adaptive container 10. The diameter of the inner wall 18 of the adaptive container 10 may be chosen to achieve a snug fit between container 14 and the inner wall 18. Since the material adequately fills inner container 14, the snug fit may not be required.

Figure 4:
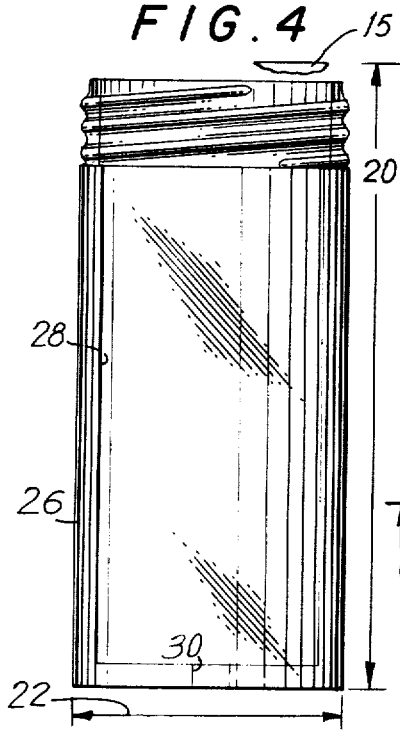
FIG. 4 is a front view of another embodiment of the adaptive container of the present invention.
Figure 5:
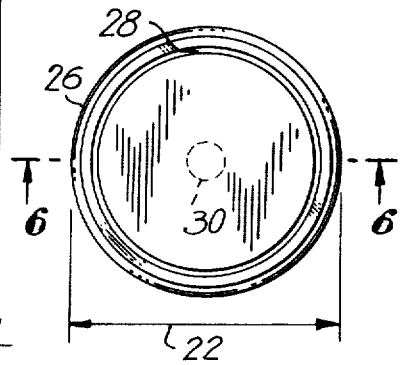
FIG. 5 is a top view of the adaptive container shown in FIG. 4.
Figure 6:
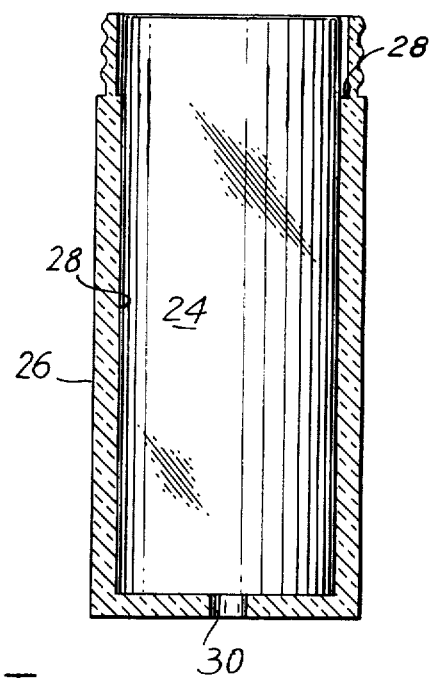
FIG. 6 is a cross-sectional view taken generally along lines 6—6 of FIG. 5.

FIGS. 4–6 illustrate yet another embodiment of the principles of the present invention with the outer dimensions 20 and 22 being the same as dimensions 11 and 12 of FIG. 1, respectively. In this embodiment, the inner container 24, which is the same as inner container 14 shown in FIG. 3, is placed in adaptive container 26. The inner wall member of the first embodiment shown in FIGS. 1–3 was smooth along its entire length while in FIGS. 4–6 a shoulder 28 is provided extending approximately from the bottom to almost the top of the inner wall member of the adaptive container 26.

By varying the thickness of the shoulder 28, different size inner containers may be snugly held in place in the adaptive container. In order to facilitate the removal of the inner container 24, a hole 30 is located at the bottom of the adaptive container 26, through which a suitable instrument may pass to force the inner container 24 out of the adaptive container 26.

In order to permit easy viewing of both the material in the inner container and the fit between the two containers, the walls of both containers are preferably transparent or at least translucent. Further, the liquid scintillation counters, the material chosen must have the desired optical qualities to pass the light waves utilized in measuring the radioactivity of the material.

As long as the outer dimensions of adaptive containers 10 and 26 approximately equal the dimensions of the standard size container being replaced, the size and shape of the respective recesses may be chosen to best accommodate the inner containers 14 and 24.

Figure 7:
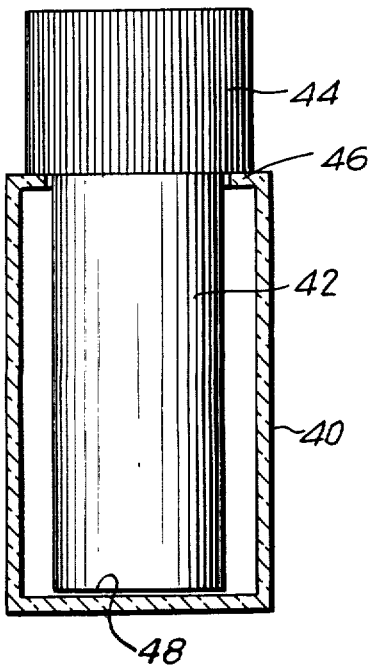
FIG. 7 is a cross-sectional view of another embodiment of the combined holder and adapter of the present invention.

In the modification of FIG. 7, there is shown a more preferred form of the present invention. In this case, the adaptive container 40 is somewhat less than the standard height dimension 20, but the outside diameter is the same as the standard O.D. 22. The second container 42 is in this case suitably capped by a threaded cover 44 and the overall height of the cover 44, which is suitably sealing by seated atop and in physical contact with an inwardly radial flange 46, the adaptive container 40 is equivalent to the standard height for the liquid container or holder conventionally used in scintillation counters. The bottom 48 of the container 42 need not necessarily come in contact with the base or bottom of container 40.

Figure 8:
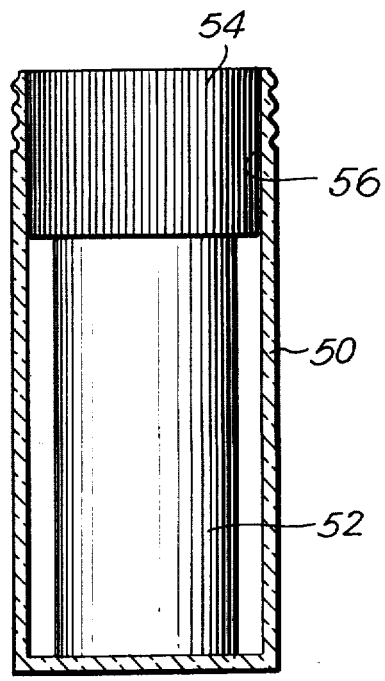
FIG. 8 is a cross-sectional view of yet a further modification of the combined holder and adapter of the present invention.

FIG. 8 on the other hand illustrates a modification where the height of the adaptive container 50 is about equal to the length 20 and the outer diameter of same is about equal to the outside diameter 22 (see FIG. 4 for outer standard dimensions). In this case, the second or inner container 52 sits on the bottom of the container 40 and is substantially centered by the cover 54 and the inner diameter 56 of the adaptive container 50, the latter of which are in physical contact with each other. The height of this second container 52 is substantially the same as the height of the container 50.

While the above detailed description illustrates a standard size container for use with a holder in a liquid scintillation counter, the principles of the present invention find wide use in other areas and, it is to be understood that this specific embodiment herein shown is not to be construed in a limiting sense, but it is merely to depict and illustrate the principles of the present invention. Modifications may be devised by those of ordinary skill in the art which will not depart from the spirit or scope of protection afforded by this application.

What is claimed is:

1. A method for assaying radioactivity of a sample of a liquid, using a liquid scintillation counter having a standard sample container wherein the standard sample container has a standard outer cross-section and defines an interior space having a standard volume, including a standard interior height and a standard interior width, the sample of the liquid being tested having a relatively small volume less than the standard volume, the method comprising placing the relatively small sample in a sample inner container, the sample inner container having an outer cross-section and defining an interior space having a height at least equal to the standard interior height and a width less than the standard interior width; removably inserting the sample inner container into an adapter holder formed of a clear, transparent material, the adapter holder comprising a longitudinally extending side wall defining an inner cross-section and an outer cross-section, the outer cross-section being substantially congruent to the standard outer cross-section and the inner cross-section of the adapter holder being larger than the outer cross-section of the inner container, but providing a relatively close fitting relationship along at least a portion of the longitudinally extending sidewall of the adapter holder so as to center the sample inner container within the adapter holder; whereby when the adapter holder, including the sample inner container inserted therewithin, is placed into the scintillation counter, the scintillation counter can accurately assay the radioactivity of the relatively small sample contained within the sample inner container.

2. In combination with liquid scintillation counter comprising a holder portion for a standard container, the liquid scintillation counter being designed to measure the radioactivity of a standard volume sample contained within a standard container, having a standard outer cross-section and defining a standard interior space having a standard interior height and a standard interior width: a device for permitting the assaying of the radioactivity of a relatively small sample of liquid, having a volume less than the standard volume, the device comprising an adapter holder having a longitudinally extending side wall formed of a transparent material and defining an outer holder cross-section and an inner holder cross-section, the outer holder cross-section being substantially congruent to the standard outer cross-section; and a sample inner container formed of a transparent material and removably held within the adapter holder, the adapter holder and the inner container having a relatively snug fitting relationship along at least a portion of the side wall of the adapter holder so as to center the inner container within the adapter holder, the sample inner container defining an interior space having a standard interior height and a width less than the standard interior width, whereby the sample inner container can be completely filled using a sample of less than the standard volume but of the full standard height.

3. The combination of claim 2 wherein the standard outer cross-section is circular and the sample inner container is a substantially cylindrical tube, concentric with the outer cross-section, but having a smaller diameter.

4. The device of claim 3, wherein the sample inner container extends beyond the longitudinally extending side walls of the adapter holder.

* * * * *